Patented Apr. 14, 1953

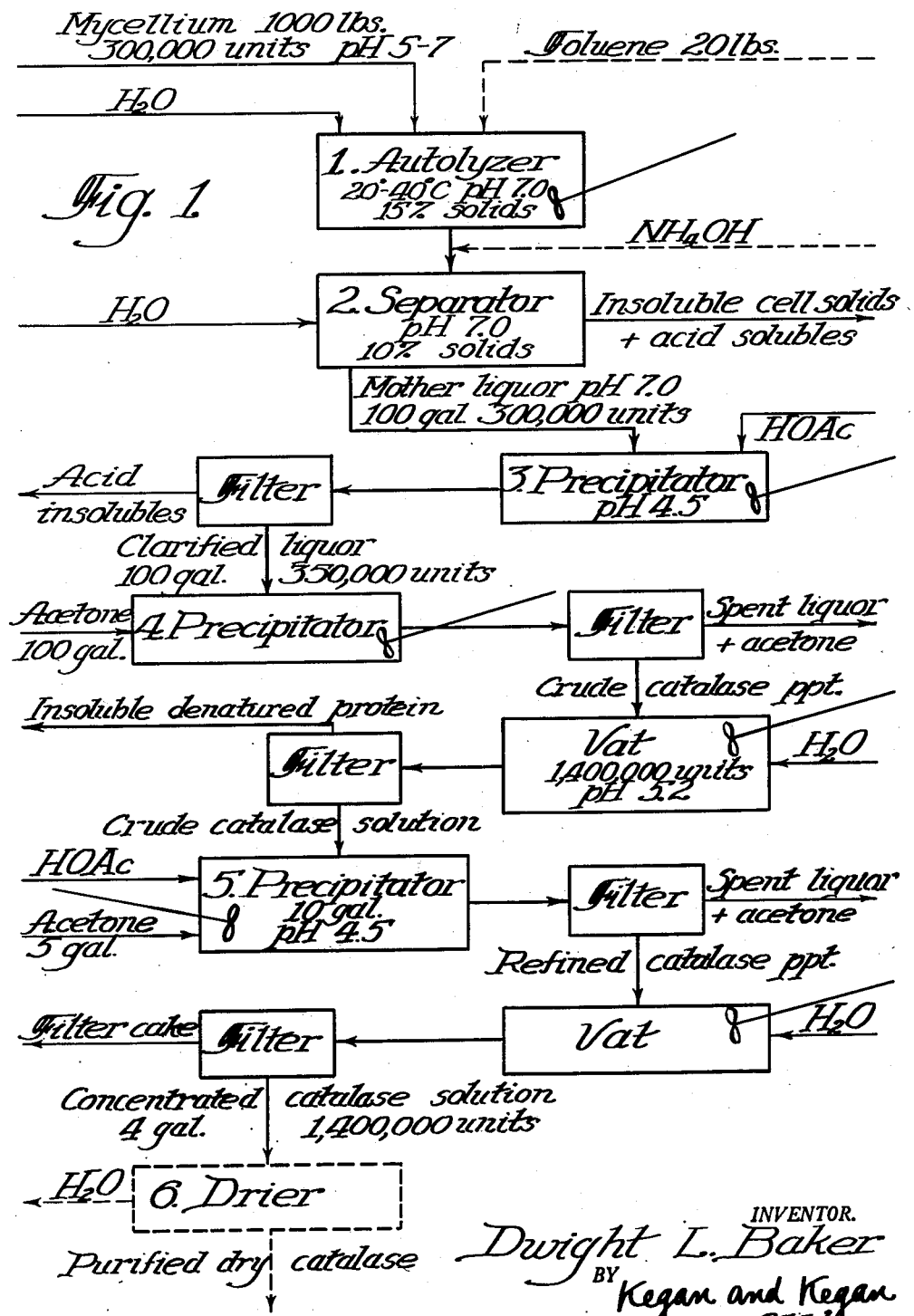

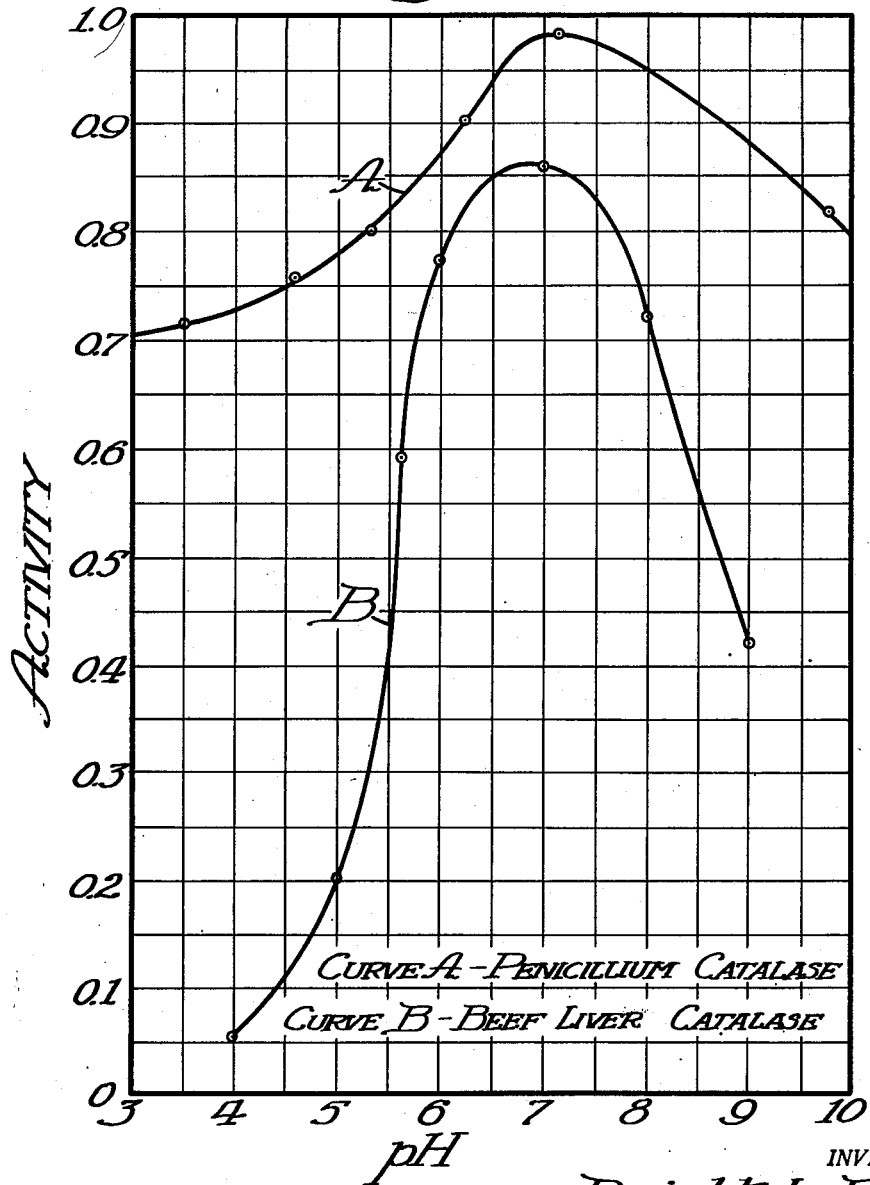

2,635,069

UNITED STATES PATENT OFFICE 2,635,069

PRODUCTION OF CATALASE FROM MOLD

Dwight L. Baker, Chicago, Ill., assignor to Ben L. Sarett, Chicago, Ill.

Application November 25, 1947, Serial No. 788,036

7 Claims. (Cl. 195—66)

The present invention relates to the art of making catalase, and to the provision of new species of catalase; more specifically, it relates to the production of catalase from mold, and the new forms of catalase obtained thereby.

It has long been known that catalase occurs in most, but not in all, living things. Its concentration varies enormously, not only from one form of life to another, but even from organ to organ in the same living creature. In many tissues, it occurs only in traces. Where it does occur, it is always entrapped within the cell and contaminated with other enzymes and biological substances inimical to its storage and use under commercial conditions. For these reasons, it has hithertofore been impossible to prepare more than trivial quantities of catalase preparations. These generally have come from mammalian animal sources, such as the liver or erythrocytes of cattle and swine. These previously known catalase preparations were difficult and expensive to prepare in small quantities, and impossible of production in substantial commercial quantities. Even worse, their activity was variable and erratic; and the preparations were highly unstable, often losing most or all of their potency within a week or two. Thus, before my invention, it was not known how to obtain large quantities of catalase in preparations of such concentration, purity, stability, activity and dependability as to possess real industrial utility.

I have now discovered that molds, and particularly the species of molds used in the commercial production of penicillin, contain species of catalase of great industrial utility; and I have invented processes whereby said catalase can be obtained therefrom in large commercial quantities, and in preparations of extraordinary potency, stability, and industrial utility.

I have found that the molds employed in the commercial production of penicillin, namely *Penicillium chrysogenum* and *Penicillium notatum*, are excellent sources of my new species of catalase; and that *Aspergillus niger* is also such a source.

I have found, further, that catalase may be manufactured from the spent mold remaining as the hitherto substantially worthless refuse from the production of penicillin, which refuse is available in large quantities. The invention also contemplates the production of catalase from the spent mold resulting from the manufacture of citric acid, and of gluconic acid; as well as from fresh molds specifically cultured for the manufacture of catalase.

In its broader aspect, my invention involves liberating catalase from mold mycelia, preferably by autolysis; separating the solid cell residues from the catalase-bearing liquor thus obtained; and purifying said crude catalase.

The forms of catalase thus obtained from mold are new compositions of matter, having properties, capabilities and advantages distinct from those of the previously known catalases derived from other sources. The catalases are enzymes which catalyze the decomposition of hydrogen peroxide into water and oxygen. My new species of catalase are operative throughout a far greater range of pH conditions than is the case with previously known species of catalase; and for this reason and others my new species of catalase are of utility wherever it is desirable to decompose hydrogen peroxide under industrial conditions; control the time, manner or rate of decomposition thereof, or insure quantitatively complete removal thereof. Thus my new catalase compositions have a wide field of industrial utility, and even extend the use of hydrogen peroxide to fields where it hithertofore has not been suitable. Among other applications, my catalase compositions are useful in the arts of bleaching, imparting porosity, and preventing peroxide formation or rancidity by eliminating all traces of hydrogen peroxide. Thus my new compositions find application in the manufacture of furs, foam rubber, textiles, feathers, soaps, foods, etc. Since my catalase preparations are of natural vegetable origin and harmless when eaten, they are specially suitable in food technology. For example, they make it feasible to use hydrogen peroxide for "raising" bread and cake; for bleaching fruit, and even oils and fats in which hydrogen peroxide must be completely removed to prevent subsequent development of rancidity; and for preserving food intermediates in circumstances where it is desired to have the final product strictly free of preservative.

As stated above, the invention may advantageously be realized by operating upon spent mold obtained as refuse from the commercial production of penicillin. According to a preferred mode of operation, the living mold is filtered, washed, and treated with a germicide (either organic, such as toluene, xylene, ethyl acetate, chloroform, etc., or inorganic, such as copper sulphate) to kill it, hasten autolysis, and prevent bacterial decomposition. The dead mold is allowed to autolyze, and the catalase is leached from the ruptured cells thereof. If the pH of the autolyzate falls below 6.0, it is made slightly alkaline to precipitate acid-soluble impurities. The autolyzate is then separated into a cell-free extract containing catalase, and an insoluble residue which is discarded. Thereafter, the extract preferably is made mildly acid to precipitate acid-insoluble impurities, which are removed. A protein-fractionating agent is then dissolved in the purified extract in such concentration and under such pH conditions that substantially all the catalase in the extract is precipitated without precipitating much inactive material. Acetone, ethanol, methanol and ammonium sulphate are suitable fractionating agents. The crude catalase precipitate is collected, and the spent mixture of extract and fractionating agent is discarded. The crude catalase is then re-dissolved in a moderate quantity of aqueous solvent; the solution is made mildly acid; and the catalase is re-precipitated. The catalase thus purified is collected, and is dissolved in a small volume of aqueous solvent, such as water or a mixture of water and glycerine. Any insoluble matter is removed, leaving a catalase solution of great potency and stability. When necessary, this solution may be preserved against bacterial decomposition by adding conventional germicides. If desired, the purified catalase may be obtained in stable solid form by drying the concentrated catalase solution in a vacuum, preferably while maintaining said solution in the frozen state.

An important feature of my invention is the step of removing the acid-insoluble impurities, since this usually results, surprisingly enough, in a substantial increase in the total catalase activity of the liquor thus purified.

An even more important feature of the invention is the step of precipitating crude catalase from the mother liquor in the absence of acid-soluble impurities, for thereby the yield of total catalase activity may be increased enormously.

Accordingly, one of the principal objects of the present invention is to provide methods for obtaining commercially valuable preparations of catalase.

Another principal object is to provide, in commercially important quantities, new species of catalase having distinctive and valuable properties.

Another object is to provide processes by which the aims of the present invention may be realized through the use of accepted chemical engineering unit processes conducted solely in standard commercial equipment.

Other objects and advantages of the invention will be apparent upon further perusal of this specification and the appended claims and drawings.

In the drawings:

Figure 1 is a flow sheet illustrating the process set forth in Example I, the principal steps being correspondingly numbered in the flow sheet and in the example, with optional operations shown in the flow sheet in broken lines; and Figure 2 is a chart showing the activity-pH relationship which characterizes penicillium catalase (curve A), and beef liver catalase (curve B).

As used herein, the term "activity" means catalytic activity in decomposing hydrogen peroxide. It is expressed in activity units, one unit of catalase activity decomposing $H_2O_2$ under standard arbitrary conditions at a rate such that the activity constant $k$ is unity in the differential equation $$\frac{-ds}{dt} = kS$$

wherein S is the concentration of $H_2O_2$ at any instant of time $t$.

The term "purity" as used herein, means the weight ratio of catalase to the total solids in the preparation—the purity being 1.0 when catalase is the only solid in the preparation.

The invention will be better appreciated by consideration of the following illustrative examples, which are based upon actual experience with specific representative batches of mold, and in which many details are specified for the assistance of those desiring to practice the invention.

It is distinctly to be understood, however, that such details are not to be construed as limitations upon the scope of my invention, which is coextensive with the scope of the appended claims.

Example I

Living *Penicillium chrysogenum* which was grown as a source of penicillin, is separated by filtration from the culture broth into which it has excreted said penicillin, and is washed free of penicillin, thereby yielding a mat which is sensibly dry to the touch, analyzing from 10% to 25% solids content, and resembling paper pulp of similar water content. In microscopic structure, this mat is a reticulum of mycelia, with considerable water retained in the capillary spaces between the mycelia.

1. *Autolysis.*—1,000 pounds of this material, of high solids content, assaying 300,000 units total activity content, pH about 7, is diluted with water to a solids content of 15%, and mixed with about twenty pounds of toluene, the mixing operation being continued for about three hours at room temperature. The mixture is allowed to stand at room temperature for about forty hours more.

In most cases, the pH of the slurry is between 6.5 and 7.2 at the end of the autolyzing operation. Sometimes it is much lower. Beginning at pH 5.5, large quantities of inactive protein go into solution. Accordingly, if the pH of the autolyzate is below 6.0, it is raised to between 7.0 and 7.5, for example by the slow addition of concentrated $NH_4OH$ under constant stirring. This precipitates the acid-soluble matter.

2. *Separation of the crude catalase liquor.*—Mixing is resumed; the slurry is diluted to about 10% solids content; from 20 to 50 pounds of infusorial earth or other filter aid is added; and the batch is filtered. The filter cake, which comprises insoluble cell residues and precipitated acid-soluble matter, is washed with water until substantially free of catalase, and is then discarded. The filtrate and washings total about 100 gallons containing 300,000 units of activity, and comprise the cell-free extract or mother liquor.

3. *Removal of acid-insoluble impurities.*—The mother liquor is brought to pH 4.5, for example by very slowly adding glacial acetic acid under constant stirring, about 1½ gallons ordinarily being required. The liquor is then allowed to stand at room temperature for about an hour. In most cases, the solution becomes turbid during acidification, and a flocculent precipitate forms in about half an hour. The precipitate is removed, for example by filtration, and discarded. Where acid-insoluble impurities are present, as evinced by the formation of a precipitate, the removal of said acid-insoluble impurities results in an increase in the total activity content of the liquor, the increase in some cases amounting to 100%. In the representative batch illustrated in the flow sheet (Figure 1), this step increased the total activity of the liquor from 300,000 units to 350,000 units.

4. *First fractionation of catalase.*—The purified mother liquor, amounting to about 100 gallons and having a pH of 4.5, is next mixed at room temperature with about 100 gallons of acetone, thereby precipitating catalase contaminated with some inactive material. The foregoing conditions achieve a fractional precipitation wherein most of the solids (including much inactive protein) remain in solution, and practically all the catalase is precipitated. This fractionation usually increases the purity of the catalase 6 or 7 fold, and surprisingly enough it enormously increases the yield of catalase activity. The total catalase activity in the precipitate varies from 100% to 1000% of the total catalase activity in the original extract. In the batch illustrated in Figure 1, the precipitate assayed 1,400,000 units, and weighed about 43 pounds, consisting of about 9 pounds of crude catalase, 5½ pounds of filter aid added to facilitate collection thereof, and 28½ pounds of retained liquor and acetone.

This precipitate is collected, and dissolved in enough water to make 10 gallons of solution, which usually exhibits a pH between 4.5 and 5.5—the value being 5.2 in the case illustrated in Figure 1. This solution is generally quite unstable with respect to its catalase activity.

5. *Re-precipitation of catalase.*—The catalase solution is adjusted to pH 4.5, for example by the gradual addition of glacial acetic acid under constant stirring, and ½ volume of acetone is added—that is, 10 gallons of the aqueous catalase solution are treated with 5 gallons of acetone. A copious precipitate forms, filter aid is added, and the precipitate is collected. This purified precipitate is re-dissolved in approximately four gallons of water. The filter aid is then filtered off, leaving a concentrated aqueous solution of catalase.

This second precipitation achieves an enormous purification of the catalase without diminution in yield. For example, the 9 pounds of crude catalase in the precipitate obtained in step 4 of the batch illustrated in Figure 1 yielded in step 5 a precipitate weighing 5½ pounds and containing about ½ pound of catalase, 1½ pounds of filter aid, and 3½ pounds of retained solvent.

The concentrated solution prepared from the refined catalase appeared green when viewed by light transmitted through it, but brownish when viewed by light reflected from it. It contained 1,400,000 activity units. In another typical instance, the activity of the crude catalase was 350 units per gram, expressed on a dry basis, and the activity of the refined catalase was 8,000 units per gram, on the same basis.

The concentrated solution may be diluted with water, glycerine, or the like to any convenient strength. Solutions of mold catalase in 1:1 mixtures of water and glycerine are highly resistant to bacterial decomposition, and are well suited for use in food manufacture. Other aqueous preparations of mold catalase may be preserved against attack by bacteria by incorporating therein any suitable preservative, such as phenylmercuric nitrate or "Merthiolate,"

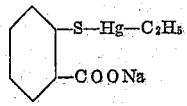

Obviously, preservatives (such as phenol) which inactivate catalase should not be used.

The solutions above described are extraordinarily stable throughout the pH range from 3.4 to 7.0. At pH 6.0, these solutions retain not less than 90% of their activity for at least 6 months, when kept at room temperature in ordinary stoppered bottles. Ordinarily, the loss of activity in 6 months is only a few per cent.

6. *Vacuum drying.*—The catalase in the concentrated aqueous solution obtained in step 5 may be converted to dry form, preferably by freezing the solution and subliming it in vacuum, as for example, by the method and apparatus described by Hays and Koch, in Science, vol. 95, page 633 (June 19, 1942).

The dry preparation is a pale green amorphous solid of low specific gravity, completely and easily soluble in water and aqueous solutions. The solid preparation assays about 5,000 units of catalase activity per gram, and may be stored at room temperature for a year or more with but slight loss of activity. It may be diluted with inert filler, such as dextrose, starch, or sodium chloride, to any convenient activity per gram.

The Penicillium catalase obtained by operating upin Penicillium molds in accordance with the process of Example I is a new and distinct species of catalase having its own unique and characteristic properties, such as molecular weight, isoelectric point, serum reactions, solubility, etc., distinguishing it from the previously known species of catalase. One of the important distinguishing characteristics of Penicillium catalase is its exceptional stability upon aging, as above described. Another is its tolerance to heat. For example, a solution maintained at 50° C. for 30 minutes showed no loss in activity. In another case, one part of catalase solution, standardized at 100 units per gram, was added to 25,000 parts of sugar syrup containing ⅓ volume $H_2O_2$, and completely destroyed the $H_2O_2$, although the operation was conducted at 50° C. In a third case, Penicillium catalase was added to gum arabic at 90° C., and effectively destroyed the $H_2O_2$ with which the gum had been treated, although the catalase was also destroyed by the procedure.

Another important identifying characteristic of Penicillium catalase is its response to the pH of its environment. Penicillium catalase is irreversibly inactivated at pH 2.5, whereas beef liver catalase is inactivated at pH 3.0. Penicillium catalase is operative throughout the pH range from 3.0 to 10.5, and the activity changes only gradually with changing pH. The relationship is quantitative and characteristic, so that Penicillium catalase may readily be identified by its activity-pH curve, which is shown in Figure 2 as curve A. This curve is drawn through the circled experimental values, determined at 0° C.

By way of contrast, curve B of Figure 2 shows the activity-pH relationship characteristic of beef liver catalase, as reported by Williams, J. Gen. Physiol. 11:309 (1928), upon tests conducted at 10° C. under comparable conditions. As is apparent from Figure 2, Penicillium catalase retains more than 70% of its maximum activity throughout the entire range of pH from 3.0 to 10.0, a span of $10^7$. The activity of beef liver catalase, on the other hand, falls off very rapidly as the pH is shifted from the optimum value; 70% of its maximum activity persisting only in the comparatively narrow pH band from 5.7 to 8.1—a span of only $10^{2.4}$. Or, to state the matter in another way, Penicillium catalase is operatively efficient (to wit, effective to more than 70% of its maximum activity) over a range of hydrogen ion concentrations 75,000 to 80,000 times as great as is the case with beef liver catalase. Thus Penicillium catalase is applicable, operative and efficient in a host of industrial situations wherein previously known catalases are commercially valueless.

The process described in Example I produces a valuable yield of mold catalase when the raw material is *Penicillium chrysogenum, Penicillium notatum, Aspergillus niger*, spent Penicillium from the production of penicillin, or spent Aspergillus obtained from the production of either citric acid or gluconic acid.

Since the raw materials are biological products, they naturally vary from batch to batch. For that reason, some of the operating details may advantageously be adjusted in accordance with the results of laboratory-scale pilot operations performed upon each batch of raw material, in order to obtain maximum yield and purity. The nature and extent of these variations will be apparent from the following discussion of commercial operations upon Penicillium molds.

*Autolysis.*—Penicillium molds autolyze readily when deprived of an adequate supply of oxygen and nutrients, even when not treated with a germicide. In commercial practice, however, it is desirable to use an antiseptic, not only to facilitate autolysis, but also to inhibit the growth of bacteria, such as the $H_2S$ generating micro-organisms, which inactivate catalase. A bacteriostatic concentration of the antiseptic is sufficient. For the organic solvents, typified by toluene, an adequate quantity is 2% of the weight of the raw mold; for $CuSO_4 \cdot 5H_2O$, 0.1% suffices.

I have successfully autolyzed mold throughout the temperature range from 10° C. to 40° C. The rate of autolysis varies somewhat with different batches of mold, but in general autolysis is completed within 24 to 48 hours at room temperature. Where it is desired to proceed as soon as the extraction of the catalase is complete, laboratory samples may be pressed from the autolyzed slurry from time to time and assayed. Extraction is complete when the total catalase activity of the entire crude liquor, as calculated from the assay upon the laboratory sample, equals that of the original batch of mold.

Removal of acid-insoluble impurities may be effected at pH values between 3.5 and 4.5.

*Precipitation of catalase.*—Substantially all the catalase in the mother liquor is precipitated in the first fractionation, if the ratio of acetone to mother liquor is between 2:3 and 1:1. The quantity of co-precipitated non-catalase protein increases as this ratio increases, so that the crude catalase is contaminated with too much foreign protein if the ratio much exceeds 1:1. The catalase is precipitated by acetone throughout the pH range from 3.8 to 8.0, but maximum yield and maximum purity are obtained when the pH is between 4.5 and 6.0, and the ratio of acetone to mother liquor is between 2:3 and 1:1. The precipitation may be effected between 0° C. and 40° C., but optimum results generally are obtained at room temperature. This is a surprising and advantageous feature of the invention, since enzymes ordinarily are not recovered in good yield except at temperatures near 0° C.

*Re-precipitation of catalase.*—Inorder to obtain a stable final preparation, the second precipitation of catalase must be performed under fairly critical conditions. The temperatures may be the same as in the first precipitation. Where acetone is used at room temperature, the pH of the catalase solution should be between 4.0 and 5.0. A pH of 4.5 uniformly gives good results, and may be employed routinely. The use of one-half volume of acetone then precipitates all the catalase without co-precipitating the impurities which make the preparation unstable. Re-precipitation with one volume of acetone fails to purify the preparation substantially.

While ammonium sulphate may be used to effect the first precipitation of catalase, a protein fractionating solvent such as acetone should be employed to purify the catalase by re-precipitation, in order to obtain a stable final preparation.

*Example II*

Penicillium notatum, pH 7, 1000 pounds, is diluted with water to a solids content of 15%; 1.5 pounds $CuSO_4 \cdot 5H_2O$ dissolved in a gallon of water is added; the resulting slurry is agitated for 2 hours, then allowed to stand at room temperature for 22 hours.

The autolysate thus formed is pressed in a hydraulic press at a pressure of 100 pounds per square inch, thereby extracting the mother liquor. The pressed pad is re-extracted with water, and the washings are added to the mother liquor.

The mother liquor is adjusted to pH 7.0 with a weak base, such as $NH_4OH$, to precipitate any acid-soluble matter, which is removed and discarded.

The pH of the partially clarified mother liquor is adjusted to between 3.8 and 4.5 by slowly adding a dilute solution of a relatively weak acid, such as citric acid or acetic acid, and the liquor is allowed to stand for one hour. Acid-insoluble matter precipitates, and is removed, for example by centrifuging.

The clarified mother liquor, amounting to 100 gallons, is adjusted to pH 6.0, and 500 pounds of ammonium sulphate is added thereto, with stirring.

The crude catalase which precipitates contains 100% of the total catalase activity of the entire original batch of 1000 pounds of *Penicillium notatum*. This precipitate is separated by centrifuging or the like.

The crude catalase is dissolved in 6 gallons of water, yielding a solution having a pH of about 6.5. The pH is adjusted to 4.3 with acetic acid, and 3 gallons of acetone is mixed therewith. The purified catalase which precipitates is separated by centrifuging, and is dissolved in a mixture of 2 gallons of water and 2 gallons of glycerine to form a stable concentrated catalase preparation which requires no preservative and is suitable for use in food manufacture.

*Example III*

*Aspergillus niger*—(strain No. 3, Northern Regional Research Laboratory) was grown submerged with stirring and aeration in accordance with the conventional methods used in the production of penicillin. After 42 hours the mold was harvested by filtration and washed. The wet mold exhibited a pH of 5.9 and a catalase activity of 2.4 units per gram.

While young Aspergillus cultures, say 24 hours old, autolyze readily, the older cultures frequently exhibit extreme resistance to enzymatic rupture of the cell walls. In such cases, the cells may be mechanically ruptured and leached to obtain the initial crude extract.

Accordingly, 780 grams of this 42 hour culture was mixed with 780 g. water, 80 ml. xylene, and 100 ml. $M/10\ Na_2HPO_4$, thus forming a very thick slurry. Extraction was effected at room temperature by grinding this slurry for 16 hours in a glass ball mill containing 4 kg. porcelain balls. The disodium phosphate buffer maintained the pH high enough to keep acid-soluble matter out of solution. At the end of this operation, the slurry was water thin.

The insoluble cell residues were removed by filtration and washed with water. The washings were added to the cell-free extract, giving a combined filtrate of 1400 ml., pH 6.6, catalase activity 1.0 unit per ml. Thus 74% of the total catalase activity of the mold appeared in the crude mother liquor. This liquor was cooled to 4° C. and added to an equal volume of acetone having a temperature of 20° C. The catalase which precipitated was collected on a filter, and 50 ml. of catalase solution was obtained by washing the filter with water. The pH of this solution was 7.1 and its catalase activity was 39 units per ml. Thus the total catalase activity of the final preparation was 140% of that of the crude mother liquor, and 104% of that of the mold from which it was prepared. The final preparation was extraordinarily stable, retaining 100% of its activity for 6 months, when stored at room temperature.

The foregoing concrete examples, considered together with the discussion herein, will enable those skilled in the art to obtain catalases from Penicillium, Aspergillus, and other molds. Having thus described and illustrated my invention, I claim:

1. The method of preparing catalase, which comprises: (1) treating Penicillium mycelium with an antiseptic selected from the group consisting of toluene, xylene, ethyl acetate, chloroform and copper sulfate, (2) autolyzing the dead mycelium, (3) adjusting the pH of the autolyzate to about 7, (4) filtering the neutral autolyzate to obtain a catalase extract substantially free of acid-soluble matter and undissolved cell residues, (5) changing the pH of said extract to between 3.5 and 4.5 to precipitate acid-insoluble impurities and removing the same, (6) adjusting the pH of the purified extract to between 4.5 and 6.0, (7) treating said purified extract with about an equal volume of acetone to precipitate crude catalase therefrom, (8) collecting said crude catalase and dissolving it in water, (9) adjusting the pH of the catalase solution to about 4.5, (10) treating said catalase solution with about one-half its volume of acetone to reprecipitate catalase therefrom, and (11) dissolving said catalase in water to obtain a stable solution thereof.

2. The process of claim 1 in which step (2) is accomplished between 10° C. and 40° C.

3. The process of claim 1, wherein steps (7) and (10) are each performed at temperatures between about 0° C. and about 40° C.

4. Process for the manufacture of catalase, comprising the steps of treating living Pencillium mycelium with toluene, thereby killing said Penicillium; maintaining the dead Penicillium at about room temperature, to autolyze the same; adjusting the pH of the autolyzate to about 7, thereby precipitating acid-soluble matter; filtering the autolyzed mass, thereby separating an extract substantially free of cells and acid-soluble matter; acidifying said extract, thereby precipitating acid-insoluble impurities; separating the acidified extract from said impurities; treating said extract at about pH 3.8 to 8.0 with at least 2/3 volume of acetone, thereby precipitating crude catalase; collecting said crude catalase; adding water thereto, thereby dissolving said crude catalase; acidifying the solution thereby formed; treating the resulting acidified solution with about 0.5 volume of acetone, thereby reprecipitating catalase; collecting the re-precipitated catalase; and dissolving the same in a small quantity of water, thereby providing a concentrated stable solution of purified catalase.

5. A process for the separation of catalase from mold mycelium containing same, said mold being from a species selected from a genus consisting of Penicillium and Aspergillus, which comprises forming an aqueous suspension of said mycelium, autolyzing said mycelium in said suspension whereby the cell walls of said mycelium are disrupted to liberate the catalase therefrom and to form a solution containing catalase, separating solid mycelium residue from the resulting catalase-containing solution while maintaining the pH of said liquor to a value above about pH 6.0, thereafter adjusting the pH of said solution to a value between about pH 3.5 and about pH 4.5 whereby additional solids are precipitated, separating said additional solids from said solution, thereafter adding acetone to said solution while maintaining the pH thereof at a value between about 3.8 and about 8.0 whereby to precipitate said catalase, and separating the precipitated catalase from said solution.

6. A process for the separation of catalase from mold mycelium containing same which comprises forming an aqueous suspension of said mycelium, disrupting the cell walls of said mycelium whereby to liberate the catalase therefrom and to form a solution containing catalase, separating solid mycelium residue from the resulting catalase-containing solution, thereafter adding a catalase-fractionating agent selected from the group consisting of acetone, methyl alcohol, ethyl alcohol and ammonium sulfate to said solution, the temperature of said solution being between about 0° and about 40° C. and the pH of said solution being between about 4.5 and about 6.0, whereby to precipitate said catalase from said solution, and then separating the precipitated catalase from said solution.

7. The process of separating catalase from an aqueous extract of disrupted cells of mold mycelium which comprises acidifying said extract to a pH value between about 3.5 and about 4.5 to precipitate impurities, separating said precipitated impurities from the acidified extract, thereafter adding acetone to said extract while maintaining the pH of said extract at a value between about 3.8 and 8.0 at a temperature between about 0° and about 40° C. whereby to precipitate said catalase from the extract and separating precipitated catalase therefrom.

DWIGHT L. BAKER.

References Cited in the file of this patent

UNITED STATES PATENTS

| Number | Name | Date |
|---|---|---|
| 525,832 | Takamine | Sept. 11, 1894 |

OTHER REFERENCES

Loew, Dept. of Agri. Departmental Report, No. 68, Catalase, 1901, page 34.

Kastle, The Oxidases, Bulletin 59, Treas. Dept., G. P. O., Washington, 1910, pp. 135, 136, Bulletin 520.

Chem. Abstracts 21: 3915 (3) Compt. Rend. Soc. Biol. 97, 524–5 (1927).

Stern, Jour. Biol. Chem. 112 (1936), pp. 161–169.

Chem. Abstracts: 35: 6732 (8) IX Hisao Matui, J. Agr. Chem. Soc. Japan, 16, 1064–70 (1940), Catalase of A. oryzae. X. Ibid. Catalase of molds and yeasts.

Advances in Enzymology, vol. I. (1941), Interscience Pub., Inc., N. Y., pages 172, 173.

Nord, Weindenhagen, Handbuch der Enzymologie II (1943), pp. 864–5.